(12) United States Patent
Schulze et al.

(10) Patent No.: US 11,787,125 B2
(45) Date of Patent: Oct. 17, 2023

(54) METHOD AND SYSTEM FOR CONNECTING TWO COMPONENTS

(71) Applicant: Airbus Operations GmbH, Hamburg (DE)

(72) Inventors: Wolfgang Schulze, Hamburg (DE); Martin Eberle, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 99 days.

(21) Appl. No.: 16/655,368

(22) Filed: Oct. 17, 2019

(65) Prior Publication Data

US 2020/0122411 A1 Apr. 23, 2020

(30) Foreign Application Priority Data

Oct. 19, 2018 (DE) .......................... 102018125979.4

(51) Int. Cl.
*B29C 65/00* (2006.01)
*B29C 65/48* (2006.01)
*B29L 31/30* (2006.01)

(52) U.S. Cl.
CPC ............ *B29C 66/721* (2013.01); *B29C 65/48* (2013.01); *B29C 66/81455* (2013.01); *B29L 2031/3076* (2013.01)

(58) Field of Classification Search
CPC . B29C 66/721; B29C 65/48; B29C 66/81455; B29C 66/8223; B29C 66/9221; B29C 66/961; B29C 66/61; B29C 66/532; B29C 66/7392; B29C 66/131; B29C 66/112; B29C 66/8242; B29C 66/9241; B29C 66/742; B29C 65/4835; B29L 2031/3076; B29L 2031/3082; B29L 2031/778; B29L 2012/00; B64F 5/10; B64C 1/1484; F16B 11/006
See application file for complete search history.

(56) References Cited

U.S. PATENT DOCUMENTS

| | | | | |
|---|---|---|---|---|
| 6,391,246 B2 * | 5/2002 | Shiraishi | ................. | B29C 43/18 156/289 |
| 6,692,681 B1 * | 2/2004 | Lunde | ................... | B29C 70/342 264/510 |
| 7,186,367 B2 * | 3/2007 | Hou | .................... | B29C 37/0064 264/553 |
| 10,195,819 B1 * | 2/2019 | Donnelly | ................ | B29C 70/86 |

(Continued)

FOREIGN PATENT DOCUMENTS

DE 102010006328 A1 8/2011

OTHER PUBLICATIONS

About.com Composites/Plastics "Vacuum Bagging: Basics" Nov. 13, 2013. (Year: 2013).*
German Search Report; priority document.

*Primary Examiner* — Cynthia L Schaller
(74) *Attorney, Agent, or Firm* — Greer, Burns & Crain, Ltd.

(57) ABSTRACT

A method for connecting two components is proposed where a pressure acting on an adhesive between two join partners is supported by an auxiliary body which rests on a cutout of one of the components. Both components to be connected together and the auxiliary body are covered by a vacuum film and once the air has been sucked out, the compressive force is generated below the vacuum film.

15 Claims, 2 Drawing Sheets

(56) References Cited

U.S. PATENT DOCUMENTS

| | | | |
|---|---|---|---|
| 2005/0051255 A1* | 3/2005 | Nordman | B32B 17/10853 |
| | | | 156/108 |
| 2007/0261787 A1 | 11/2007 | Malis | |
| 2010/0213644 A1* | 8/2010 | Driver | B29C 70/549 |
| | | | 264/553 |
| 2012/0168071 A1* | 7/2012 | Kennedy | B29D 99/001 |
| | | | 156/349 |
| 2015/0008624 A1* | 1/2015 | Louie | B29C 33/10 |
| | | | 264/571 |
| 2015/0147114 A1 | 5/2015 | McCullough et al. | |
| 2016/0207256 A1* | 7/2016 | Watson | B29C 66/1122 |
| 2017/0057182 A1* | 3/2017 | Bernetich | B29C 70/44 |
| 2018/0178460 A1 | 6/2018 | Parkes et al. | |

* cited by examiner

METHOD AND SYSTEM FOR CONNECTING TWO COMPONENTS

CROSS-REFERENCES TO RELATED APPLICATIONS

This application claims the benefit of the German patent application No. 102018125979.4 filed on Oct. 19, 2018, the entire disclosures of which are incorporated herein by way of reference.

FIELD OF THE INVENTION

The invention relates to a method for connecting two components and to a system for connecting two components.

BACKGROUND OF THE INVENTION

In modern vehicle construction, the most varied connecting methods are used for connecting two components. The type of a connection frequently depends on the materials used, the size of the components to be connected, the shape thereof and the load provided. Whereas welding or riveting methods are frequently used when using metal join partners, large-area components produced from plastics materials are often glued. If different materials, for example plastics and metals, are used, gluing can also be effected here. It is possible to use rivets for additional securement, this, however, requires the join partners to be processed in a more costly and elaborate manner.

For producing precise adhesions, it is known to expose the join partners and the adhesive to a pressure. Multiple advantages can be achieved as a result. In the case of polycondensation adhesives, fission products, and, in particular, water, can be driven out of the adhesive bond. Solvent residues can be removed from the adhesive bond in the case of solvent adhesives. It is also possible to improve the adhesion between the adhesive and the two join partners and the moistening, which results in an improved capacity. The pressure can be applied, for example, in an autoclave. The adhesive does not run out of the adhesive join and the adhesive thickness remains extensively constant. The stiffer or thicker the components to be bonded together, the greater the pressure required in order to balance out dimensional tolerances of the surfaces in the adhesive join.

SUMMARY OF THE INVENTION

The use of an autoclave is, however, very complex and cost-intensive, in particular in the case of very large components which are to be connected together. It is an object of the invention to propose a method for connecting two components where a pressure is able to be applied onto the adhesive between two join partners in as simple a manner as possible without an autoclave being required.

Proposed is a method for connecting two components, the method comprising the steps of arranging a first component on a tool surface, of arranging a second component, which comprises a cutout, on the first component to include an adhesive, of placing an auxiliary body covering the cutout onto the second component, of covering the second component, the auxiliary body and at least one closure region of the first component surrounding the second component with a vacuum film, of evacuating the space surrounded by the first component and the vacuum film and of removing the vacuum film once the adhesive has hardened.

The arranging of a first component on a tool surface is to be understood to the effect that the first component is placed onto the tool surface so that a provided join surface located thereon is easy to reach from the outside. The join surface is then consequently arranged in a preferred manner on a side remote from the tool surface.

In addition, the tool surface does not necessarily have to be formed by a continuously closed surface, but it is also conceivable for individual support surfaces to be present for the placing of the first component. In particular, larger components, for instance fuselage shells of an aircraft or the like, could be arranged on a system produced from support surfaces or retaining elements.

The second component comprises a cutout which is utilized, for example, for realizing a window frame. The second component is placed in such a manner onto the first component that the join surface of the second component lies on the join surface of the first component. The join surface of the second component can be arranged, for instance, on an edge around the cutout.

In addition, the adhesive is brought between the first component and the second component. This can be effected as a result of the adhesive being applied onto the first join surface or onto the second join surface. It can also be advantageous to apply the adhesive on the two join surfaces. It is conceivable for the adhesive to be applied onto the relevant join surface in a metered manner by means of a delivery device, for example guided by a robot. Otherwise, the adhesive can also be applied manually in the case of small-scale production. It is additionally conceivable to use the adhesive as an adhesive film which is solid at room temperature and only becomes liquid as a result of heat and hardens thereby coating the components.

A particular advantage is provided by placing an auxiliary body, which covers the cutout, onto the second component. This auxiliary body can exceed the dimensions of the cutout and be placed onto the second component in a flush manner. A force which is exerted onto the auxiliary body is able to act on the second component through contact surfaces between the auxiliary body and the second component.

When the auxiliary body rests on the second component and it covers the cutout, the second component, the auxiliary body and at least one closure region of the first component surrounding the second component are covered with a vacuum film. A sealed space below the vacuum film which can be evacuated is consequently generated as a result. By evacuating this space, the ambient pressure consequently acts via the auxiliary body on the second component which, as a result, furnishes the adhesive between the first component and the second component with a compressive force. The adhesive can be hardened in this state. After hardening, the vacuum film is removed.

The particular advantage of the method according to the invention is that hardening in an autoclave is not necessary without, however, dispensing with the impingement at a higher pressure than is reachable by just a vacuum, i.e., approximately 0.9 bar. The higher pressure for producing a desired adhesion can be achieved by the applied auxiliary body in spite of the cutout of the second component. Consequently, significantly easier and more cost-efficient bonding of the two components together is possible because the bonding is able to be achieved simply by a vacuum and, where applicable, with heating in a normal production environment outside an autoclave without intermediate transport or another treatment of the two join partners being necessary.

The first component can be a fiber-reinforced composite or a metal material. Independently of this, the second component can also be a fiber-reinforced composite or a metal material. Possible reinforcing elements which are mentioned further below, could also be produced independently of this from a fiber-reinforced composite or a metal material.

In a preferred manner, the method comprises the step of heating a space between the first component and the second component in which the adhesive is situated. The heating can be effected by heating the tool surface, the first component and/or the second component. For example, the tool surface can be heated so that the first component situated thereon or the adhesive can be heated. As an alternative to this, the second component can also be heated by placing heating elements thereon or by heat radiation. It is conceivable to use heating mats, a furnace, a continuous furnace or similar. It is additionally conceivable to use an adhesive system which requires a temperature of between 100° C. and 450° C. for hardening. For instance, bonding systems are known for bonding fiber-reinforced composites which harden at a temperature of 180°. In addition, other bonding systems are also known which harden at significantly lower temperatures or are exposed to higher temperatures for activation, for instance in the case of fiber-reinforced composites with a thermoplastic matrix.

In an advantageous embodiment, the method additionally comprises the step of introducing a reinforcing element between the first component and the second component, wherein adhesive is trapped between the first component and the reinforcing element and between the reinforcing element and the second component. The reinforcing element can be used for thickening a region of the first component which supports the second component. As the second component comprises a cutout, it can be sensible to use the reinforcing element for thickening a circumferential edge surface around the cutout so that there is greater strength.

In an advantageous embodiment, the first component comprises a first cutout and the second component comprises a second cutout, wherein the second component is placed onto the first component in such a manner that the first cutout and the second cutout are oriented in alignment with one another. As a result, the join surface can be an edge surface around the first cutout, onto which a corresponding portion of the second component can be placed. Such an arrangement could be realized, for example, on a fuselage shell of a commercial aircraft, the first cutout being a window cutout and the second component providing a window frame. It is particularly preferred for the previously named reinforcing element to be introduced between the two components.

An advantageous embodiment can additionally comprise the step of clamping the auxiliary body on the mold by means of an element exerting a tensile force or a compressive force. If a pressure is necessary in the adhesive layer which is not producible on the auxiliary body just by the action of the vacuum, the auxiliary body can be clamped for additional support. The clamping can be achieved by exerting a tensile force in the direction of the mold or by pressing with the help of a compressive force onto a side of the auxiliary body which is remote from the mold. The additional force acting on the auxiliary body can be controlled in dependence on the necessary pressure.

It is advantageous when the clamping includes the screwing-in of a bolt through an opening arranged in the auxiliary body. The mold can comprise, for example, for this purpose, a threaded bore into which a bolt can be screwed. For this purpose, the first component should also comprise a cutout through which the bolt is able to extend into the mold. As a result, the additional force acting on the auxiliary body can be very easily controlled by the tightening torque of the bolt, for example, being adjusted.

However, the clamping can also include the pressing of the auxiliary body onto the second component with an actuator. The actuator can press onto the auxiliary body and can provide a suitable contact surface for this purpose. The actuator is arranged on a side of the auxiliary body remote from the mold and is retained, for example, on a rigid frame. This can be connected rigidly to the mold. The actuator can be a hydraulic actuator or a pneumatic actuator. To control the force precisely it is conceivable to use a force measuring unit which is coupled with a regulating unit which, in turn, activates the actuator. This could be sensible when using, in particular, a hydraulic actuator in order to avoid introducing excessive force. Obviously, it would also be possible to use spindle gears or similar line drives which are not based on a fluid acted upon by pressure. A torque could be monitored in this case in order to limit a compressive force acting on the auxiliary body.

If a pneumatic actuator is used, this could be coupled with a vacuum source which is used for evacuation. As a result, there is less expenditure on construction because a separate pressure source is not necessary to move the actuator. In addition to this, the compressive force generated on the auxiliary body can also be significantly limited because it would only be possible to achieve a pressure of no more than approximately 0.95 bar acting on an effective surface of the actuator by means of the vacuum source.

The second component comprises a flange which runs around the cutout at least in regions and extends from the second component in a direction remote from the first component, wherein the auxiliary body is placed onto the flange. This arrangement, which is realized, for instance, for a window frame of a passenger aircraft, allows the force to be introduced from the auxiliary body into the second component in a good manner. The auxiliary body could comprise a circumferential groove which is adapted to the flange and is movable into contact with an outside edge of the flange.

The invention additionally relates to a system for connecting two components, the system comprising a mold, an auxiliary body, a vacuum film, a vacuum source and an adhesive, wherein the mold comprises a tool surface for receiving a first component, wherein the auxiliary body is realized for the purpose of being placed onto a second component and in this case covering a cutout of the second component, wherein the vacuum film is realized for the purpose of covering the second component placed onto the first component to include the adhesive, the auxiliary body placed onto the second component and at least one closure region of the first component surrounding the second component, and wherein the vacuum source is couplable with at least one opening in the vacuum film or in the mold so that a space surrounded by the first component and the vacuum film is evacuatable. It is conceivable for the system according to the invention to be able to carry out the method provided above.

The mold surface can comprise a continuous contact surface which is partially interrupted or of just individual contact surfaces and can be realized for the purpose of the first component being able to be placed thereon.

The auxiliary body could comprise a sufficiently stable material which is suitable for the intended purpose. As the auxiliary body simply serves as a tool, it can comprise a wooden plate, wood fibers, a plastics material, metal or other materials.

The vacuum source could be realized, in particular, in the form of an exhaust fan. A connection to the vacuum source can be produced through an opening in the vacuum film so that air from the space surrounded by the vacuum film is sucked out and, as a result, the ambient pressure acts on the components located below the vacuum film.

In a preferred manner, the auxiliary body comprises a slidable coating. For example, it could comprise polytetrafluorethylene. This ensures that the vacuum film is also easily releasable from the auxiliary body after heating and that the auxiliary body is consequently able to be used multiple times.

In an advantageous embodiment, the tool surface comprises a threaded bore, wherein the auxiliary body comprises an opening which aligns with the threaded bore when the first component, the second component and the auxiliary body are positioned as provided, and wherein the system additionally comprises a bolt with a thread which corresponds to the threaded bore for clamping the auxiliary body to the mold.

As detailed above, the system can additionally comprise an actuator for pressing the auxiliary body onto the second component. As also shown, the actuator can be a pneumatic actuator, a hydraulic actuator or a linear drive. It could be desirable when using a pneumatic actuator to carry out a coupling with the vacuum source so that the complexity of the system can be reduced.

The system can additionally comprise a force regulating unit which is coupled with the actuator and is realized for the purpose of identifying the force acting on the auxiliary body by the actuator and adjusting it to a predetermined value. The force acting on the auxiliary body can be delimited by the force regulating unit so that the compressive force acting on the adhesive layer is adjusted precisely.

BRIEF DESCRIPTION OF THE DRAWINGS

Further features, advantages and application possibilities of the present invention are produced from the following description of the exemplary embodiments and the Figures. In this case, all described and/or graphically shown features, independently of their composition in the individual claims or the references thereto, also form the object of the invention per se and in arbitrary combination. In addition, identical reference symbols stand for identical or similar objects in the Figures.

DETAILED DESCRIPTION OF THE PREFERRED EMBODIMENTS

Figure 1:
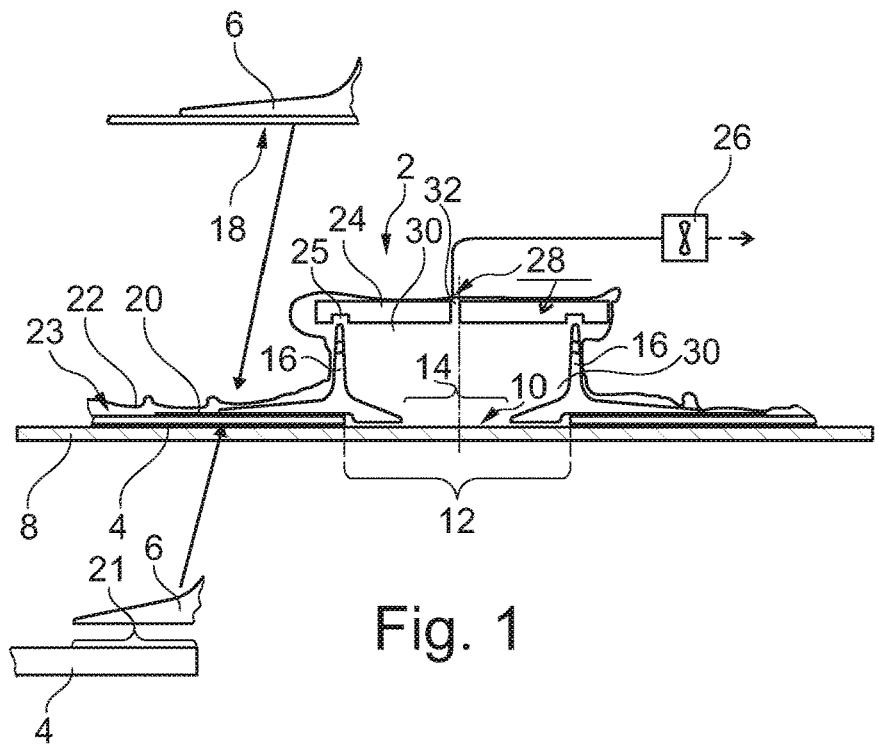
FIG. 1 shows a sectional representation of a system according to the invention for connecting two components.

FIG. 1 shows a sectional representation of a system 2 for connecting a first component 4 and a second component 6. A mold 8 comprises a tool surface 10 onto which the first component 4 is placed. In this representation, the tool surface 10 is realized in a solid, i.e., continuous, manner. This could, however, also be modified as long as it is ensured that an arrangement located thereon is air-tight and evacuatable.

The first component 4 is, for example, a fuselage shell of a passenger aircraft which comprises a first cutout 12 at the position shown. This is, for example, a window cutout and is round, oval or extensively rectangular with rounded corners. The second component 6 is a window frame which is to be subsequently located inside in the finished aircraft fuselage and has a second cutout 14 which is aligned with the first cutout 12.

The second component 6 additionally comprises a flange 16 which runs around the second cutout 14 and extends from the second component 6 in a direction remote from the first component 4. The flange 16 follows, for instance, an edge of the first cutout 12 and, as a result, can be a portion of a lateral surface of a hollow cylinder or of a hollow cone.

For connecting the first component 4 and the second component 6, the second component 6 comprises a contact surface 18 which lies, for example, radially outside the flange 16. The contact surface 18 serves for producing a surface contact between the second component 6 and the join partner. This is shown here, for example, in the form of a reinforcing element 20 which is used for thickening an edge surface 21 of the first component 4 running around the first cutout 12. The contact surface 18 is consequently glued to the reinforcing element 20 which is glued in the meantime to the edge surface 21. The reinforcing element 20, however, can also be omitted should a thickening not be necessary. The contact surface 18 is consequently then glued to the edge surface 21.

In the example shown, a layer of adhesive is present in each case between the first component 4 and the reinforcing element 20 and between the reinforcing element 20 and the second component 6. This could be realized as a thermosetting adhesive.

A vacuum film 22, which could be glued onto the first component 4 and in this case cover the second component 6 entirely, is used for pressing the components 4 and 6 onto one another. The adhesive is acted upon with pressure after evacuation in order to optimize the quality of the adhesion. As, however, the second component 6 comprises the second cutout 14, on account of the limited contact surface it cannot be expected that a sufficient compressive force can be produced by purely placing the vacuum film 22 in position.

In order to increase this, an auxiliary body 24 which is placed onto the flange 16 and, in this case, covers the second cutout 14 entirely, is provided. The auxiliary body 24 comprises, as an example, a circumferential groove 25 which is adapted to the form of the flange 16. The groove 25 can be placed onto the flange 16 in a flush manner.

The complete arrangement of mold 8, first component 4, second component 6 and auxiliary body 24 is covered by the vacuum film 22. This film extends up to a closure region 23 which is clearly located outside the second component 6. After the space located below this film is evacuated, the entire surface, which is determined by an outer contour of the second component 6, acts to generate a compressive force in the direction of the mold 8. The auxiliary body 24 results in introducing a comparatively large compressive force onto the flange 16 so that the adhesive which is located radially outside is loaded with a predetermined compressive force and is consequently exposed to a desired pressure.

A vacuum source 26, which is shown schematically as a block, can be coupled with an opening 28 of the vacuum film 22 and can suck air out of an interior 30 below the vacuum film 22. The opening 28 can be aligned with a through bore 32 of the auxiliary body 24. As an alternative to this, such an opening could also be integrated in the mold 8. As a result of the evacuation, the vacuum film 22 tightens against all components located below it and presses them in the direction of the tool surface 10. The adhesive is consequently exposed to a desired pressure.

The connection between the two components 4 and 6 can consequently be effected outside an autoclave. In particular, larger components are able to be processed with such a system.

Figure 2:
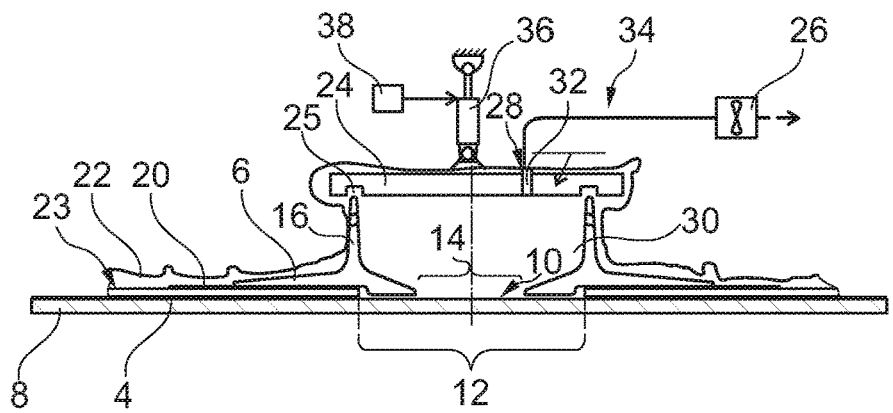
FIG. 2 shows a sectional representation of a modified system for connecting components.

Should, however, the pressure achieved by the system 2 not yet be sufficient, the auxiliary body 24 could be additionally clamped. A modified system 34 shown in FIG. 2, in which a schematically represented actuator 36 is also provided in addition to the components in FIG. 1, could be used for this purpose. This actuator acts on the auxiliary body 24. The actuator 36 can be a hydraulic or pneumatic actuator and can be supplied with a fluid which is acted upon with pressure. The force exerted by the actuator 36 can be adjusted by regulating the pressure applied to the actuator 36. As an alternative to this, the actuator 36 can also comprise a spindle gear which is coupled with an electric motor. Fluid lines and electrical lines which are necessary for the operation of the actuator 36 are not shown for the sake of simplicity.

It is also conceivable for the actuator 36 to be coupled with a force regulating unit 38 which delimits a force exerted on the auxiliary body 24 by the actuator 36. A force measuring device, which measures the force exerted onto the auxiliary body 24 and actuates the actuator 36 in dependence thereof, can be provided for this purpose.

Figure 3:
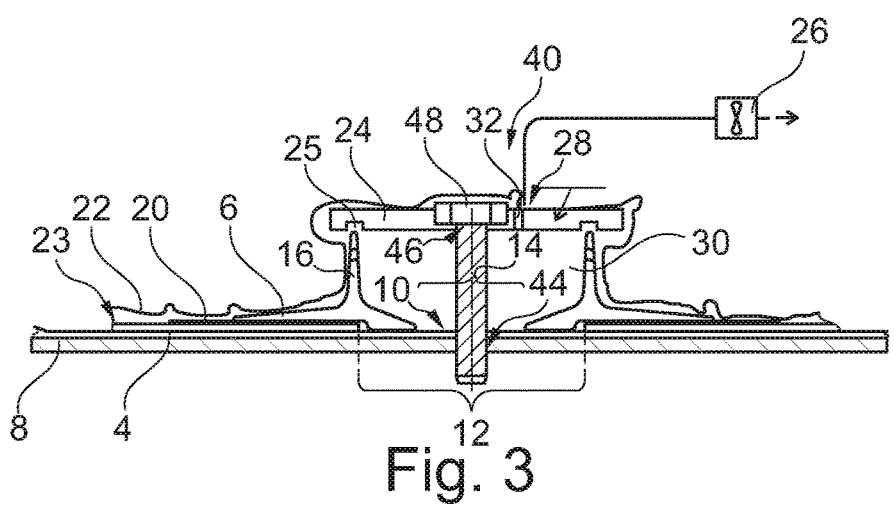
FIG. 3 shows a sectional representation of a further modified system for connecting components.

As shown in FIG. 3 by way of a modified system 40, it is also possible to use a bolt 42 which extends into a threaded bore 44 of the mold 8 and is guided through a corresponding opening 46 of the auxiliary body 24. It is possible to adjust an additional compressive force acting on the second component 6 by screwing the bolt 42 through the opening 46 into the threaded bore 44. In a particularly preferred manner, it is possible to adjust the additional compressive force in a precise manner by using a torque wrench at a screw head 48 of the bolt 42.

Figure 4:
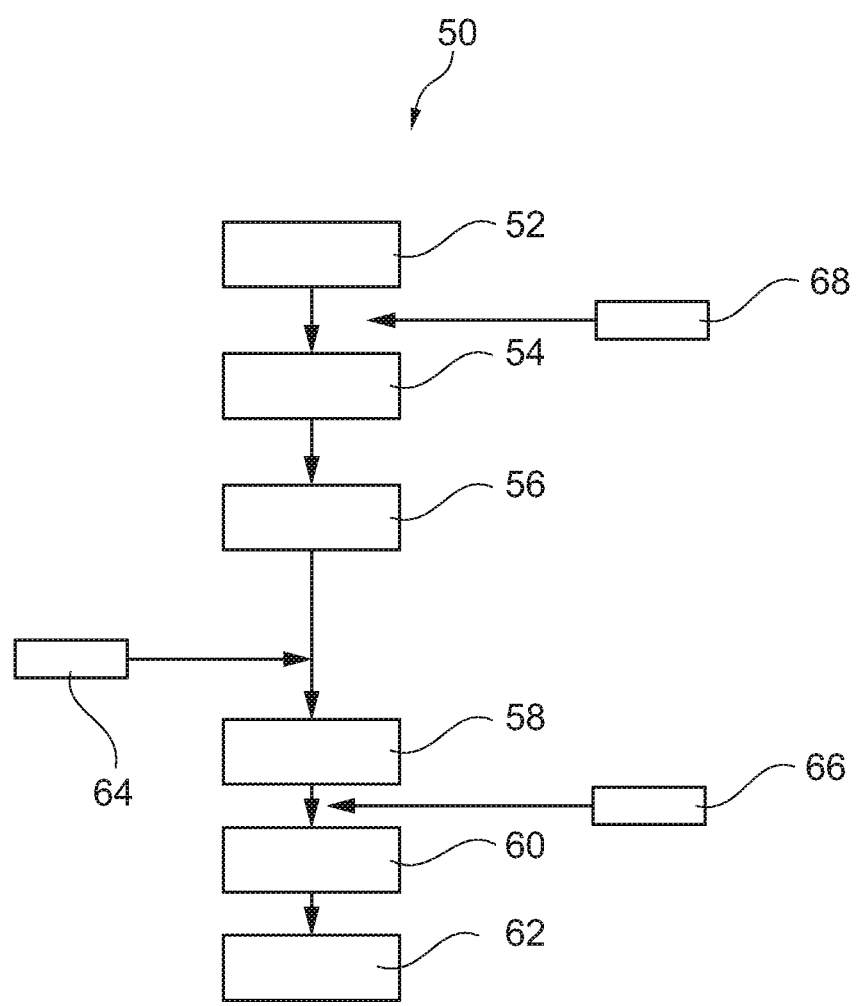
FIG. 4 shows a schematic, block-based representation of a method for connecting components.

Finally, FIG. 4 shows a schematic, block-based representation of a method 50 for connecting two components 4 and 6. The method 50 comprises the step of arranging 52 the first component 4 on the tool surface 10. The second component 6, which comprises the cutout 14, is then placed onto the first component 4 to include an adhesive 54. The auxiliary body 24 covering the second cutout 14 is placed 56 onto the second component 6. In addition, the second component 6, the auxiliary body 24 and at least one closure region of the first component 4 surrounding the second component 6 are covered 58 with the vacuum film 22. The space 30 enclosed by the first component 4 and the vacuum film 22 is then evacuated 60. Once the adhesive has hardened, the vacuum film 22 is removed 62. As an option, the auxiliary body can also be clamped 64 prior to being covered 58. In addition, after the covering 58, a space between the first component 4 and the second component 6, in which the adhesive is situated, can be heated 66. As another option, it is possible to introduce 68 the reinforcing element 20 between the first component 4 and the second component 6 so that reinforcing in particular of an edge region about the first cutout 12 is effected.

In addition, it must be pointed out that "comprising" does not exclude any other elements or steps, and "a" or "an" does not exclude a plurality.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCES

2 System
4 First component
6 Second component
8 Mold
10 Tool surface
12 First cutout
14 Second cutout
16 Flange
18 Contact surface
20 Reinforcing element
21 Edge surface
22 Vacuum film
23 Closure region
24 Auxiliary body
25 Groove
26 Vacuum source
28 Opening
30 Interior
32 Through bore
34 System
36 Actuator
38 Force regulating unit
40 System
42 Bolt
44 Threaded bore
46 Opening
48 Screw head
50 Method
52 Arrange the first component
54 Arrange the second component
56 Place the auxiliary body in position
58 Cover with vacuum film
60 Evacuate
62 Remove the vacuum film
64 Clamp the auxiliary body
66 Heat
68 Introduce the reinforcing element

The invention claimed is:

1. A method for connecting two components, comprising the steps:
   arranging a first component on a tool surface,
   arranging a second component, which comprises a cutout, on the first component, wherein an adhesive is between the first component and the second component,
   placing an auxiliary body covering the cutout onto the second component,
   covering the second component, the auxiliary body and at least one closure region of the first component with a vacuum film such that the vacuum film directly contacts each of the second component, the auxiliary body, and the first component, wherein the at least one closure region surrounds the second component, evacuating a space surrounded by the first component and the vacuum film with a pressure of less than 1.0 bar, hardening the adhesive without an autoclave, and removing the vacuum film once the adhesive has hardened, wherein the second component comprises a flange which protrudes perpendicularly to a body of the second component, and the auxiliary body is placed onto the flange.

2. The method according to claim 1, additionally comprising the step of heating a space between the first component and the second component in which the adhesive is situated.

3. The method according to claim 1, additionally comprising a step of introducing a reinforcing element between the first component and the second component, wherein the adhesive is trapped between the first component and the reinforcing element and between the reinforcing element and the second component.

4. The method according to claim 1, wherein the first component comprises a first cutout, wherein the second component comprises a second cutout and wherein the second component is placed onto the first component in such a manner that the first cutout and the second cutout are oriented in alignment with one another.

5. The method according to claim 1, additionally comprising a step of clamping the auxiliary body on a mold by means of an element exerting a tensile force or a compressive force.

6. The method according to claim 5, wherein the clamping includes a screwing-in of a bolt through an opening arranged in the auxiliary body.

7. The method according to claim 5, wherein the clamping includes the pressing of the auxiliary body onto the second component with an actuator.

8. The method according to claim 7, wherein the actuator is coupled with a vacuum source which is used for evacuation.

9. The method according to claim 1, wherein the flange runs around the cutout at least in regions.

10. A system for connecting two components, comprising:
a mold,
an auxiliary body,
a vacuum film,
a vacuum source configured to provide no more than 1.0 bar of pressure, and
an adhesive,
wherein the mold comprises a tool surface for receiving a first component,
wherein the auxiliary body is placed onto a second component and sized to cover a cutout of the second component,
wherein the vacuum film covers and directly contacts the second component placed onto the first component, and covers and directly contacts the auxiliary body placed onto the second component, and covers and directly contacts at least one closure region of the first component surrounding the second component, wherein the adhesive is between the first component and the second component,
wherein the second component includes a flange, such that the auxiliary body includes a groove adapted to receive the flange,
wherein the vacuum source is couplable with at least one opening in the vacuum film or in the mold so that a space surrounded by the first component and the vacuum film is evacuatable,
wherein the flange of the second component runs around the cutout at least in regions and projects perpendicularly to a body of the second component,
wherein no more than 1.0 bar of pressure is applied by the system to couple the first component and the second component together with the adhesive.

11. The system according to claim 10, wherein the auxiliary body comprises a slidable coating.

12. The system according to claim 10, wherein a surface of the mold comprises a threaded bore, wherein the auxiliary body comprises an opening which aligns with the threaded bore, and wherein the system additionally comprises a bolt with a thread which corresponds to the threaded bore for clamping the auxiliary body to the mold.

13. The system according to claim 10, additionally comprising an actuator for pressing the auxiliary body onto the second component.

14. The system according to claim 13, additionally comprising a force regulating unit which is coupled with the actuator that identifies a force acting on the auxiliary body by the actuator and adjusts it to a predetermined value.

15. The method according to claim 1, wherein the auxiliary body includes a groove adapted to a form of the flange.

* * * * *